US008462143B2

(12) United States Patent
Morita

(10) Patent No.: US 8,462,143 B2

(45) Date of Patent: Jun. 11, 2013

(54) INTEGRATED CIRCUIT DEVICE, ELECTRO OPTICAL DEVICE AND ELECTRONIC APPARATUS

(75) Inventor: Akira Morita, Shinuosuwa-machi (JP)

(73) Assignee: Seiko Epson Corporation, Tokyo (JP)

(*) Notice: Subject to any disclaimer, the term of this patent is extended or adjusted under 35 U.S.C. 154(b) by 755 days.

(21) Appl. No.: 12/713,292

(22) Filed: Feb. 26, 2010

(65) Prior Publication Data

US 2010/0225625 A1 Sep. 9, 2010

(30) Foreign Application Priority Data

Mar. 6, 2009 (JP) ................................ 2009-053310

(51) Int. Cl.
*G06F 3/038* (2006.01)

(52) U.S. Cl.
USPC ............ 345/205; 345/89; 345/212; 345/213; 345/690

(58) Field of Classification Search
USPC ........................... 345/87–100, 204–215, 690
See application file for complete search history.

(56) References Cited

U.S. PATENT DOCUMENTS

| | | | | |
|---|---|---|---|---|
| 5,517,155 | A | 5/1996 | Yamauchi et al. | |
| 7,502,008 | B2 * | 3/2009 | Jeoung et al. | 345/98 |
| 7,605,831 | B2 * | 10/2009 | Ng | 345/691 |
| 7,808,493 | B2 | 10/2010 | Hashimoto et al. | |

FOREIGN PATENT DOCUMENTS

| | | |
|---|---|---|
| JP | A-07-283722 | 10/1995 |
| JP | A-09-243993 | 9/1997 |
| JP | A-2000-305505 | 11/2000 |
| JP | A-2002-062857 | 2/2002 |
| JP | A-2004-029409 | 1/2004 |
| JP | A-2004-45967 | 2/2004 |
| JP | A-2007-310234 | 11/2007 |

* cited by examiner

*Primary Examiner* — Vijay Shankar
(74) *Attorney, Agent, or Firm* — Oliff & Berridge, PLC

(57) ABSTRACT

An integrated circuit device includes: a data driver that drives a plurality of data lines of an electro optical device; and a data distribution circuit that supplies data to the data driver, wherein the data driver includes an odd numbered data line driver circuit for driving odd numbered data lines among the plurality of data lines, an even numbered data line driver circuit for driving even numbered data lines among the plurality of data lines, an odd numbered data line latch circuit provided for the odd numbered data line driver circuit, and an even numbered data line latch circuit provided for the even numbered data line driver circuit; and the data line distribution circuit, upon receiving time serially inputted image data, supplies odd numbered data line image data for the number of multiplexes to the odd numbered data line latch circuit, and supplies even numbered data line image data for the number of multiplexes to the even numbered data line latch circuit.

10 Claims, 15 Drawing Sheets

Ordinary multiplex drive

Multiplex drive with dispersive drive

| | When dispersive drive is not conducted | | | | | | When dispersive drive is conducted | | | | |
|---|---|---|---|---|---|---|---|---|---|---|---|
| Data line | OPA | SEL | Output grayscale level | Offset of OPA | Actual output grayscale level | | OPA | SEL | Output grayscale level | Offset of OPA | Actual output grayscale level |
| D1 | 1 | 1 | 10 | 1 | 11 | | 1 | 1 | 10 | 1 | 11 |
| D2 | 1 | 2 | 10 | | 11 | | 2 | 1 | 10 | 2 | 12 |
| D3 | 1 | 3 | 10 | | 11 | | 1 | 2 | 10 | 1 | 11 |
| D4 | 1 | 4 | 10 | | 11 | | 2 | 2 | 10 | 2 | 12 |
| D5 | 2 | 1 | 10 | 2 | 12 | | 1 | 3 | 10 | 1 | 11 |
| D6 | 2 | 2 | 10 | | 12 | | 2 | 3 | 10 | 2 | 12 |
| D7 | 2 | 3 | 10 | | 12 | | 1 | 4 | 10 | 1 | 11 |
| D8 | 2 | 4 | 10 | | 12 | | 2 | 4 | 10 | 2 | 12 |
| D9 | 3 | 1 | 10 | 0 | 10 | | 3 | 1 | 10 | 0 | 10 |
| D10 | 3 | 2 | 10 | | 10 | | 4 | 1 | 10 | 2 | 12 |
| D11 | 3 | 3 | 10 | | 10 | | 3 | 2 | 10 | 0 | 10 |
| D12 | 3 | 4 | 10 | | 10 | | 4 | 2 | 10 | 2 | 12 |
| D13 | 4 | 1 | 10 | 2 | 12 | | 3 | 3 | 10 | 0 | 10 |
| D14 | 4 | 2 | 10 | | 12 | | 4 | 3 | 10 | 2 | 12 |
| D15 | 4 | 3 | 10 | | 12 | | 3 | 4 | 10 | 0 | 10 |
| D16 | 4 | 4 | 10 | | 12 | | 4 | 4 | 10 | 2 | 12 |
| D17 | 5 | 1 | 10 | 0 | 10 | | 5 | 1 | 10 | 0 | 10 |
| D18 | 5 | 2 | 10 | | 10 | | 6 | 1 | 10 | 1 | 11 |
| D19 | 5 | 3 | 10 | | 10 | | 5 | 2 | 10 | 0 | 10 |
| D20 | 5 | 4 | 10 | | 10 | | 6 | 2 | 10 | 1 | 11 |
| D21 | 6 | 1 | 10 | 1 | 11 | | 5 | 3 | 10 | 0 | 10 |
| D22 | 6 | 2 | 10 | | 11 | | 6 | 3 | 10 | 1 | 11 |
| D23 | 6 | 3 | 10 | | 11 | | 5 | 4 | 10 | 0 | 10 |
| D24 | 6 | 4 | 10 | | 11 | | 6 | 4 | 10 | 1 | 11 |
| D25 | 7 | 1 | 10 | 1 | 11 | | 7 | 1 | 10 | 1 | 11 |
| D26 | 7 | 2 | 10 | | 11 | | 8 | 1 | 10 | 2 | 12 |
| D27 | 7 | 3 | 10 | | 11 | | 7 | 2 | 10 | 1 | 11 |
| D28 | 7 | 4 | 10 | | 11 | | 8 | 2 | 10 | 2 | 12 |
| D29 | 8 | 1 | 10 | 2 | 12 | | 7 | 3 | 10 | 1 | 11 |
| D30 | 8 | 2 | 10 | | 12 | | 8 | 3 | 10 | 2 | 12 |
| D31 | 8 | 3 | 10 | | 12 | | 7 | 4 | 10 | 1 | 11 |
| D32 | 8 | 4 | 10 | | 12 | | 8 | 4 | 10 | 2 | 12 |

FIG. 6A

FIG. 6B

INTEGRATED CIRCUIT DEVICE, ELECTRO OPTICAL DEVICE AND ELECTRONIC APPARATUS

The entire disclosure of Japanese Patent Application No. 2009-53310, filed Mar. 6, 2009 is expressly incorporated by reference herein.

BACKGROUND

1. Technical Field

An aspect of the present invention relates to integrated circuit devices, electro optical devices and electronic apparatuses.

2. Related Art

In recent years, high definition imaging technology such as high vision imaging have become popular, and higher definition and higher multiple grayscale levels are being pursued for display apparatuses such as liquid crystal projectors and the like. As higher definition and higher multiple grayscale are progressed, the higher the multiple grayscale levels, the smaller the grayscale voltage for each grayscale level becomes, which causes a problem in which display irregularity would occur even when a small error occurs in data voltages.

The applicant has developed a multiplex driving type driver in which each data line driving circuit writes data voltages for a plurality of pixels in each one horizontal scanning period. However, the driver of this type entails a problem in that display irregularity (streaks) is generated in a displayed image due to variations in offset voltages of operational amplifiers to be multiplex-driven.

For example, JP-A-2004-45967 (Patent Document 1) describes a method for averaging errors in data voltages by switching the order of driving a plurality of data lines to be multiplex-driven at each horizontal scanning period.

SUMMARY

In accordance with some embodiments of the invention, it is possible to provide integrated circuit devices, electro optical devices and electronic apparatuses, which can reduce display irregularity.

An embodiment of the invention pertains to an integrated circuit device having: a data driver for driving a plurality of data lines of an electro optical device, and a data distribution circuit that supplies data to the data driver, wherein the data driver includes an odd numbered data line driver circuit for driving odd numbered data lines among the plurality of data lines, an even numbered data line driver circuit for driving even numbered data lines among the plurality of data lines, an odd numbered data line latch circuit provided for the odd numbered data line driver circuit, and an even numbered data line latch circuit provided for the even numbered data line driver circuit; and the data line distribution circuit, upon receiving time serially inputted image data, supplies odd numbered data line image data for the number of multiplexes to the odd numbered data line latch circuit, and supplies even numbered data line image data for the number of multiplexes to the even numbered data line latch circuit.

According to an aspect of the embodiment of the invention described above, upon receiving time serially inputted image data, it is possible to separate the image data into odd numbered data line image data and even numbered data line image data, and supply them to the data driver. Therefore, adjacent odd numbered data lines and even numbered data lines can be driven by independent data line driving circuits.

In accordance with an aspect of the embodiment of the invention, the odd numbered data line latch circuit may latch the odd numbered data line image data, and supply the same to the odd numbered data line driver circuit. The odd numbered data line driver circuit, upon receiving the odd numbered data line image data, may output a multiplexed odd numbered data line data signal. The even numbered data line latch circuit may latch the even numbered data line image data, and supply the same to the even numbered data line driver circuit. The even numbered data line driver circuit, upon receiving the even numbered data line image data, may output a multiplexed even numbered data line data signal. Demultiplexed data signals obtained by demultiplexing the multiplexed odd numbered data line data signal by a demultiplexer may be supplied to corresponding ones of the odd numbered data lines in one horizontal scanning period. Demultiplexed data signals obtained by demultiplexing the multiplexed even numbered data line data signal by the demultiplexer may be supplied to corresponding ones of the even numbered data lines in one horizontal scanning period.

By so doing, adjacent odd numbered data lines and even numbered data lines can be multiplex-driven by independent data line driving circuits, respectively. As a result, grayscale differences that may be caused by variations in characteristics of the operational amplifiers can be averaged, whereby display irregularities can be reduced.

In accordance with an embodiment of the invention, the integrated circuit device may include a switch signal generation circuit that generates a demultiplex switch signal for ON/OFF controlling a plurality of demultiplex switching elements included in the demultiplexer.

Accordingly, multiplexed odd numbered data line data signals and multiplexed even numbered data line data signals can be demultiplexed by the demultiplexer.

In accordance with an aspect of the embodiment of the invention, the data distribution circuit may include a first latch circuit that latches the image data for at least four multiplexes with a multiphase clock, and a second latch circuit having a first odd numbered data latch section that latches the odd numbered data line image data among the image data based on a first clock, and a first even numbered data latch section that latches the even numbered data line image data among the image data based on a second clock.

Therefore, upon receiving time serially inputted image data, odd numbered data line image data for the number of multiplexes and even numbered data line image data for the number of multiplexes can be separated and latched.

Furthermore, in accordance with another aspect of the embodiment of the invention, the data distribution circuit may include a third latch circuit, wherein the third latch circuit includes a second odd numbered data latch section that latches data of the first odd numbered data latch section based on a third clock and supplies the data to the odd numbered data line latch circuit, and a second even numbered data latch section that latches data of the first even numbered data latch section based on the third clock, and supplies the data to the even numbered data line latch circuit.

In this manner, at each cycle of the third clock, odd numbered data line image data for the number of multiplexes and even numbered data line image data for the number of multiplexes can be supplied to the odd numbered data line latch circuit and the even numbered data line latch circuit, respectively.

In accordance with another aspect of the embodiment of the invention, the data distribution circuit may include a dispersion switch circuit provided between the first latch circuit and the second latch circuit, wherein, when a dispersion mode is enabled, the dispersion switch circuit may output the odd numbered data line image data among the image data to the first odd numbered data latch section, and the even numbered data line image data among the image data to the first even numbered data latch section.

By so doing, when the dispersion mode is enabled, a dispersive drive in which adjacent odd numbered data lines and even numbered data lines are multiplex-driven by independent data line driving circuits can be made effective. On the other hand, when the dispersion mode is disenabled, the dispersion drive is disabled; in other words, a multiplex drive without a dispersive drive can be performed.

In accordance with another aspect of the embodiment of the invention, the data distribution circuit may include a shift direction switch circuit provided between the second latch circuit and the third latch circuit, wherein, in a first shift direction mode, the shift direction switch circuit may output data of the first odd numbered data latch section to the second odd numbered data latch section and output data of the first even numbered data line latch section to the second even numbered data line latch section; and in a second shift direction mode, the shift direction switch circuit may invert the order of data of the first odd numbered data latch section and output the data to the second even numbered data line latch section, and may invert the order of data of the first even numbered data line latch section and output the data to the second odd numbered data latch section.

Bo so doing, an image displayed on an electro optical panel can be left-to-right inverted (mirror-inverted), whereby it is possible to accommodate two types of projectors, i.e., front projection type and rear projection type projectors (projection type display devices).

Furthermore, in accordance with another aspect of the embodiment of the invention, the data distribution section may include a third latch circuit, wherein the third latch circuit may have a common latch section. The common latch section may latch data of the first odd numbered data latch section based on a third clock and supply the data to the odd numbered data line latch circuit, and then may latch data of the first even numbered data line latch section based on the third clock and supply the data to the even numbered data line latch section.

Accordingly, this makes it unnecessary to provide two latch sections for odd numbered data and even numbered data, and the common latch section can latch both of odd numbered data line image data and even numbered data line image data. Furthermore, by the use of the common latch section, the number of latch sections can be reduced, and the number of elements of the third latch circuit can be reduced.

In accordance with another aspect of the embodiment of the invention, the data distribution circuit may include a shift direction switch circuit provided between the second latch circuit and the third latch circuit, wherein, in a first shift direction mode, the shift direction switch circuit may output data of the first odd numbered data latch section to the common latch section, and then output data of the first even numbered data line latch section to the common latch section; and in a second shift direction mode, the shift direction switch circuit may invert the order of data of the first odd numbered data latch section and output the data to the common latch section, and then may invert the order of data of the first even numbered data line latch section and output the data to the common latch section.

By so doing, an image displayed on an electro optical panel can be left-to-right inverted (mirror-inverted), whereby it is possible to accommodate two types of projectors, i.e., front projection type and rear projection type projectors (projection type display devices).

Another embodiment of the invention pertains to an electro optical device and an electronic apparatus, which includes any one of the integrated circuit devices described above.

BRIEF DESCRIPTION OF THE DRAWINGS

FIGS. 6A and 6B are tables for describing effects of a dispersive drive.

DESCRIPTION OF EXEMPLARY EMBODIMENTS

Preferred embodiments of the invention are described in detail below. It is noted that the embodiments described below do not unduly limit the content of the invention recited in the scope of the claimed invention, and all of the compositions to be described in the embodiments may not necessarily be indispensable as means for solution provided by the invention.

1. Multiplex Drive

In accordance with some embodiments of the invention, by performing a dispersive drive to be described below in a multiplex drive (line sequential drive), display irregularities (streaks) that may be caused by offset voltages of operational amplifiers can be reduced. Prior to describing an embodiment of the invention, an ordinary multiplex drive, in other words, a multiplex drive without performing a dispersive drive will be described below.

1.1. Composition Example of Liquid Crystal Display Device

Referring to FIGS. 1-4, multiplex drive (line sequential drive) to be performed by the present embodiment will be described.

An example in which a single color display liquid crystal panel that may be used for a liquid crystal projector and the like is driven by a driver (an integrated circuit device) will be described below. However, in accordance with an embodiment of the invention, a liquid crystal panel that displays multiple colors such as RGB may be driven by a driver. Also, in accordance with an embodiment of the invention, an electro optical panel other than a liquid crystal panel may be driven by a driver. For example, the invention is also applicable to electro optical panels (electro optical devices in a broader sense), such as, electro-luminescence (EL) panels, such as, for example, an organic EL panel and an inorganic EL panel, an electrophoretic display (EPD) panel, and the like.

Also, an embodiment in which data voltages are supplied as data signals to data signal supply lines to be described below will be described as an example. However, in accordance with another embodiment of the invention, data currents may be supplied as data signals to the data signal supply lines.

Figure 1:
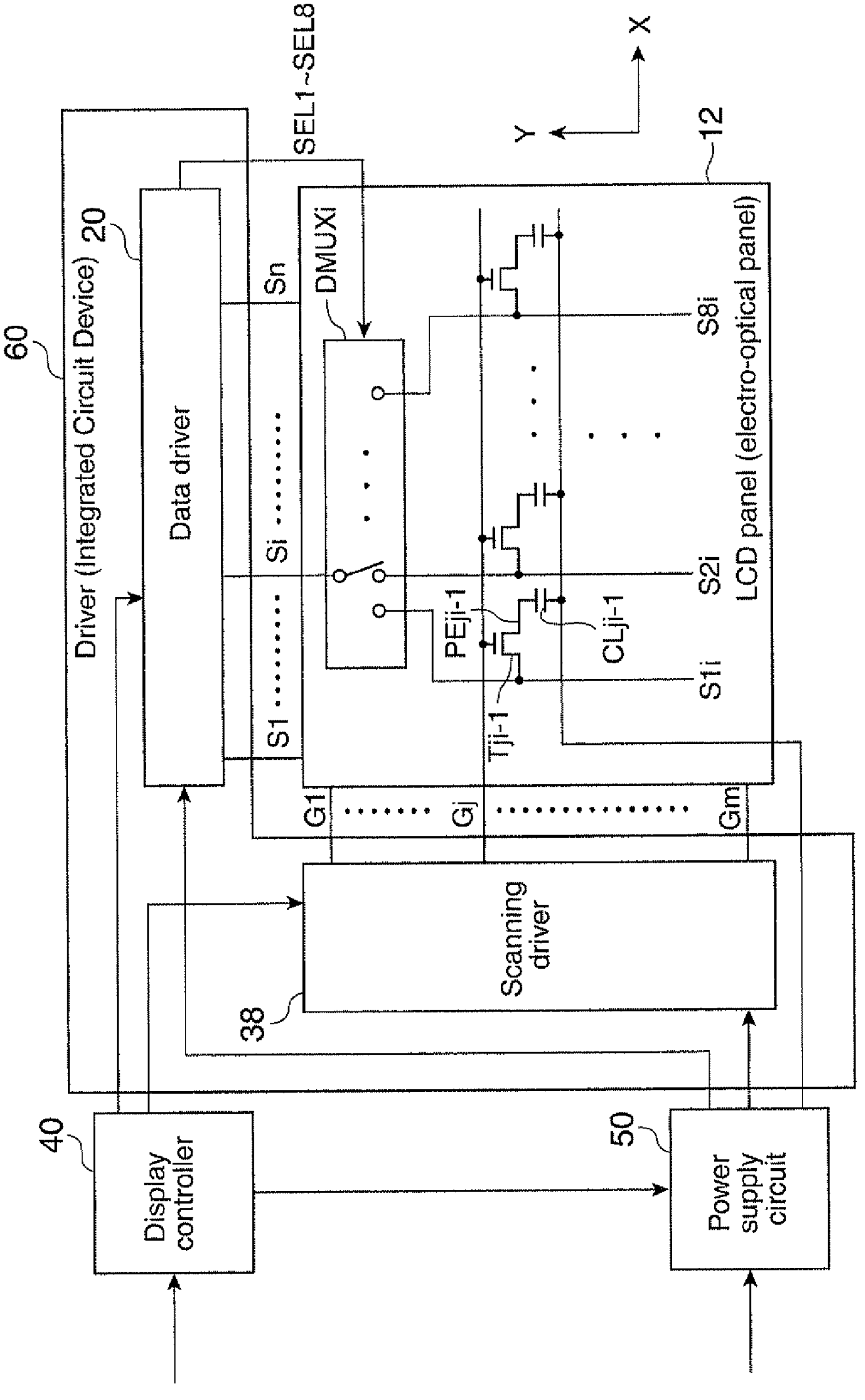
FIG. 1 shows a composition example of a liquid crystal display device.

FIG. 1 shows an example composition of a liquid crystal display device (LCD) (an electro optical device in a broader sense). The example composition shown in FIG. 1 includes a liquid crystal panel 12 (an electro optical panel in a broader sense), a driver 60 (an integrated circuit device), a display controller 40, and a power supply circuit 50. It is noted that the liquid crystal display device in accordance with the invention is not limited to the composition shown in FIG. 1, and many modifications including omission of a portion of the components (for example, the display controller or the like), addition of other components and the like are possible. For example, FIG. 1 shows an example in which a demultiplexer to be described below is included in a liquid crystal panel. However, in accordance with another embodiment of the invention, the demultiplexer may be included in a data driver 20 to be described below.

The liquid crystal panel 12 may be comprised of, for example, an active matrix type liquid crystal panel. The liquid crystal panel 12 has a liquid crystal substrate (for example, a glass substrate), on which scanning lines G1-Gm (m is a natural number of 2 or greater) arranged in plurality in Y direction of FIG. 1, and extending in X direction are disposed. Also, data lines S11-S81, S12-S82, . . . , S1*n*-S8*n* (n is a natural number of 2 or greater) arranged in plurality in X direction, and extending in Y direction are disposed on the liquid crystal substrate. Furthermore, on the liquid crystal substrate are provided data signal supply lines S1-Sn (data voltage supply lines or data current supply lines) and demultiplexers DMUX1-DMUXn corresponding to the data signal supply lines, respectively.

Also, on the liquid crystal substrate, thin film transistors are provided at positions corresponding to intersections between the scanning lines G1-Gm (gate lines) and data lines S11-S81, S12-S82, . . . , S1*n*-S8*n* (source lines). For example, a thin film transistor Tji-1 is provided at the position corresponding to an intersection between the scanning line Gj (j is a natural number less than m) and the data line S1*i* (i is a natural number less than n).

Further, for example, the thin film transistor Tji-1 has a gate electrode that is connected to the scanning line Gj, a source electrode connected to the data line S1*i*, and a drain electrode connected to a pixel electrode PEji-1, A liquid crystal capacitance CLji-1 (a liquid crystal element, or an electro optical element in a broader sense) is formed between the pixel electrode PEji-1 and a counter electrode CE (a common electrode).

The demultiplexers DMUX1-DMUXn divide (separate, demultiplex) time-division data voltage (or data current, data signal in a broader sense) supplied to the data signal supply line (source voltage supply line) and supply the same to the data lines. More specifically, the demultiplexer DMUXi includes switch elements (a plurality of demultiplex switch elements) corresponding to the respective data lines. The switch elements are ON/OFF controlled by demultiplex switch signals SEL1-SEL8 (multiplex control signals) from the data driver 20, whereby the data voltage (source voltage) supplied to the data signal supply line Si is divided and supplied to the data lines S1*i*-S8*i*.

It is noted that FIG. 1 shows only the demultiplexer DMUXi and the data lines S1*i*-S8*i* corresponding to the data signal supply line Si, for the sake of simplification of the description. Also, only the thin film transistors provided at the positions corresponding to intersections between the data lines S1*i*-S8*i* and the scanning line Gj are shown. However, demultiplexers and data lines for other data signal supply lines and thin film transistors provided at positions corresponding to intersections of other data lines and scanning lines are similarly provided.

The data driver 20 outputs time-division data voltage to the data signal supply lines S1-Sn based on image data (grayscale data), thereby driving the data signal supply lines S1-Sn. On the other hand, the scanning driver 38 scans (sequentially drives) the scanning lines G1-Gm of the liquid crystal panel 12.

The display controller 40 controls the data driver 20, the scanning driver 38 and the power supply circuit 50. For example, the display controller 40 sets operation modes, supplies vertical synchronization signals and horizontal synchronization signals generated therein to the data driver 20 and the scanning driver 38. The display controller 40 performs controlling of the above according to contents set by, for example, an unshown host controller (for example, a central processing unit (CPU)).

The power supply circuit 50 generates various voltage levels (for example, reference voltages for generating grayscale voltages) necessary for driving the liquid crystal panel 12, voltage levels of counter electrode voltages VCOM on the counter electrode CE, based on the reference voltage (power supply voltage) supplied from outside.

Referring to FIG. 1, an example in which the data voltages are supplied to eight data lines from one data signal supply line in the single color display liquid crystal panel is described. However, in accordance with the invention, the data voltage may be supplied to a different number of data lines from one data signal supply line. For example, in accordance with an aspect of the invention, in the case of an RGB display liquid crystal panel, data voltage may be supplied from one data signal supply line to six data lines corresponding to R1, G1, B1, R2, G2 and B3.

1.2. Data Driver

Figure 2:
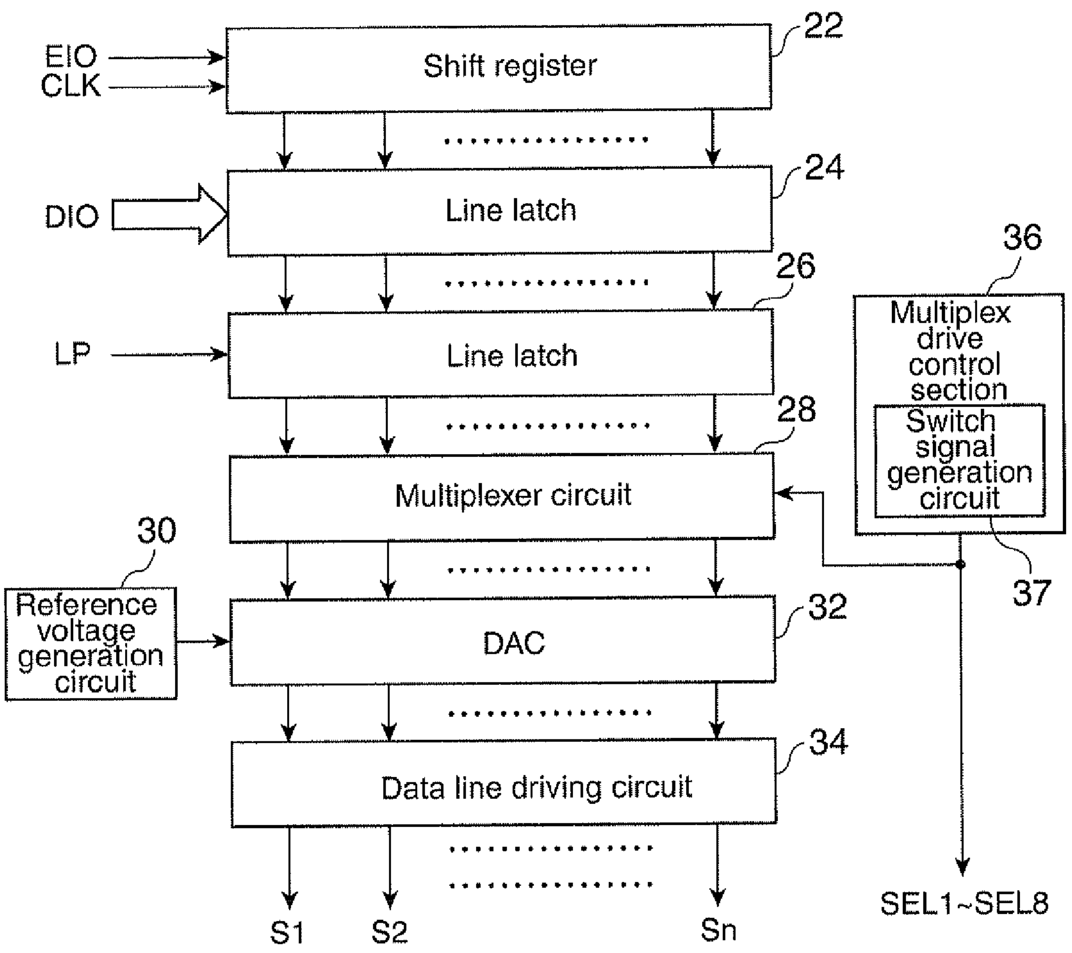
FIG. 2 shows a composition example of a data driver.

FIG. 2 shows an example composition of the data driver 20 shown in FIG. 1. The data driver 20 includes a shift register 22, line latches 24 and 26, a multiplexer circuit 28, a reference voltage generation circuit 30 (a grayscale voltage generation circuit), a DAC 32 (digital-to-analog converter, or a data voltage generation circuit in a broader sense), a data line driving circuit 34 and a multiplex drive control section 36.

The shift register 22 is provided for each of the data lines, and includes a plurality of sequentially connected flip-flops. The shift register 22 operates in synchronism with a clock signal CLK, and upon retaining an enable I/O signal EIO at the leading flip-flop, sequentially shifts the enable I/O signal EIO to an adjacent one of the flip-flops.

Image data DIO (grayscale data) is inputted in the line latch 24. The line latch 24 latches the image data DIO in synchronism with the enable I/O signal EIO that is sequentially shifted and inputted from the shift register 22.

The line latch 26 latches image data latched by the line latch 24 for the unit of one horizontal scanning, in synchronism with horizontal synchronization signals LP.

It is noted that the clock signal CLK, the enable I/O signal EIO, the image data DIO and horizontal synchronization signals LP are inputted from, for example, the display controller 40.

The multiplexer circuit 28, upon receiving image data corresponding to each data line from the line latch 26, time-division multiplexes the image data corresponding to eight data lines, and outputs the time-division multiplexed image data corresponding to each of the data signal supply lines. The multiplexer circuit 28 multiplexes image data based on multiplex control signals SEL1-SEL8 from the multiplex drive control section 36.

The multiplex drive control section 36 generates multiplex control signals SEL 1-SEL 8 that specify the timing of time-division of data voltages. More specifically, the multiplex drive control section 36 includes a switch signal generation circuit 37, and the switch signal generation circuit 37 generates multiplex control signals SEL1-SEL8. Then, the multiplex drive control section 36 supplies the multiplex control signals SEL1-SEL8 as demultiplex switch signals to the demultiplexers DMUX1-DMUXn.

The reference voltage generation circuit 30 generates a plurality of reference voltages (grayscale voltages), and supplies the same to the DAC 32. The reference voltage generation circuit 30 generates a plurality of reference voltages based on, for example, a voltage level supplied from the power supply circuit 50.

The DAC 32 generates analog grayscale voltages to be supplied to each of the data lines based on digital image data. More specifically, the DAC 32 receives the time-division multiplexed image data from the multiplexer circuit 28 and the plurality of reference voltages from the reference voltage generation circuit 30, and generates time-division multiplexed grayscale voltages corresponding to the time-division multiplexed image data.

The data line driving circuit 34 buffers (impedance-converts in a broader sense) the grayscale voltages from the DAC 32 and outputs data voltages to the data signal supply lines S1-Sn, thereby driving the data lines S11-S81, S12-S82, . . . , S1*n*-S8*n*. For example, the data line driving circuit 34 buffers the grayscale voltages with a voltage-follower connected operation amplifier provided at each of the data signal supply lines.

1.3. Operations of Multiplex Driving

Figure 3:
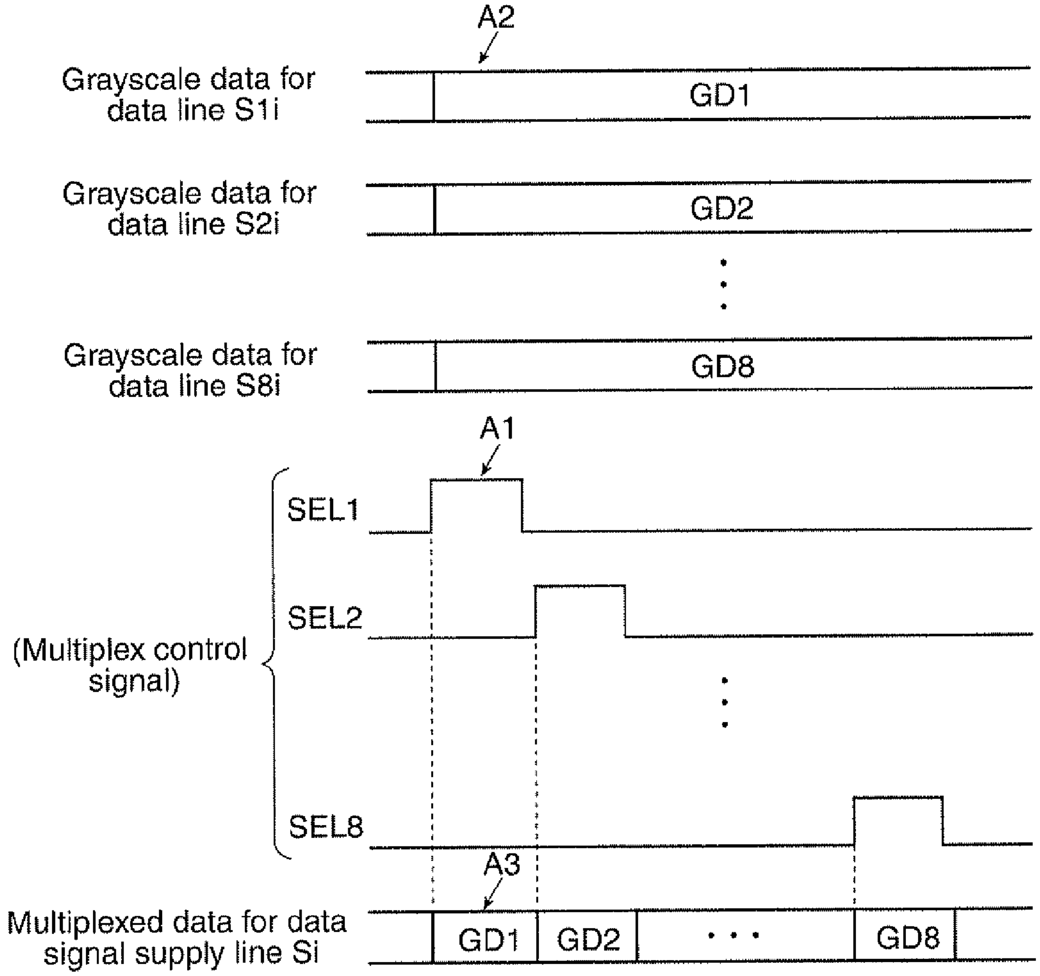
FIG. 3 is a chart for describing operations of a multiplex drive.
Figure 4:
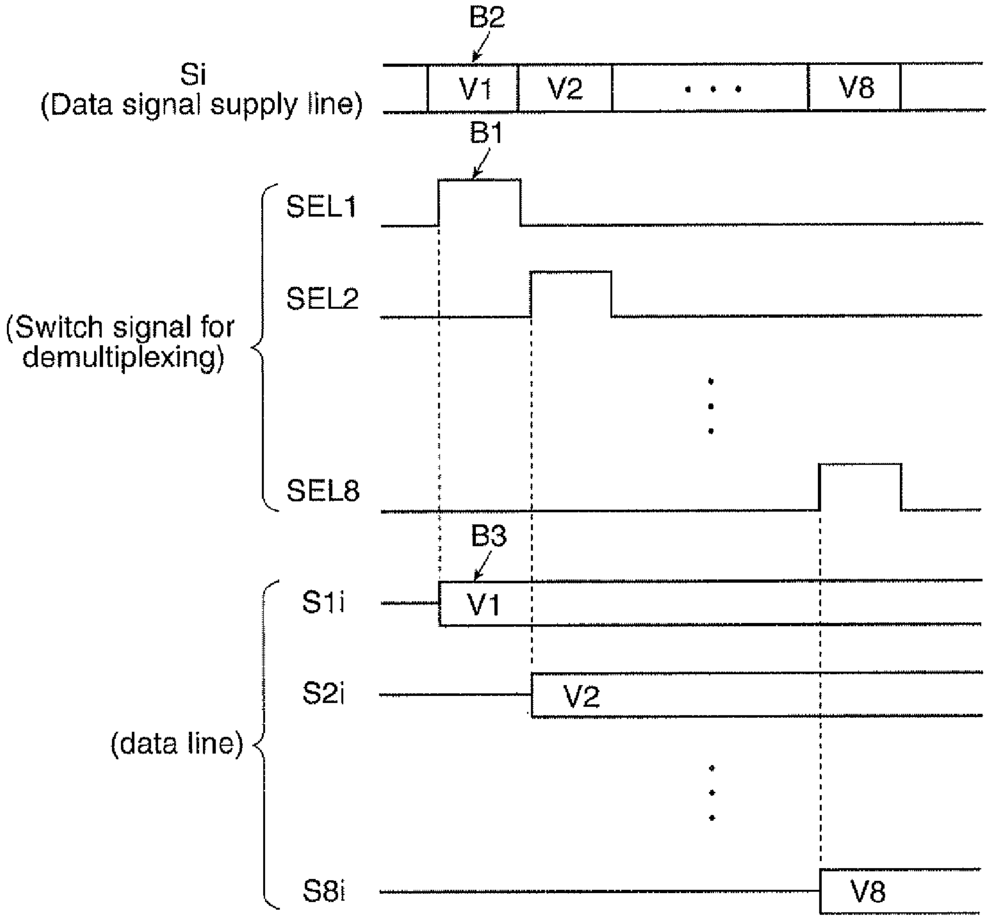
FIG. 4 is a chart for describing operations of a multiplex drive.

FIGS. 3 and 4 show charts for describing operations of the multiplex driving circuit 36. It is noted that, referring to FIGS. 3 and 4, an example of operations of the demultiplexer DMUXi is described. However, the description thereof is similarly applicable to the other demultiplexers.

FIG. 3 shows a chart for explaining operations of the multiplexer circuit 28. As shown in FIG. 3, image data GD1-GD8 are latched by the line latch 26 as the image data for the data lines S1*i*-S8*i*.

When the multiplex control signal SEL1 becomes active as indicated by A1 in FIG. 3, the multiplexer circuit 28 selects the image data GD1 indicated at A2, as indicated by A3 and outputs the same. Then, when the multiplex control signal SEL2 becomes active, the multiplexer circuit 28 selects and outputs the image data GD2. When the multiplex control signal SEL8 becomes active, the multiplexer circuit 28 selects and outputs the image data GD8.

In this manner, the multiplexer circuit 28 generates multiplex data of the image data GD1-GD8 that are time-division multiplexed, based on the multiplex control signals SEL1-SEL8, each of which becomes active once in each one horizontal scanning period.

Upon receiving the time-division multiplexed image data GD1-GD8, the DAC 32 selects a grayscale voltage corresponding to each of the image data from among the reference voltages (grayscale voltages) and outputs the same. Then, the DAC 32 outputs the time-division multiplexed image data.

FIG. 4 is a chart for describing operations of the demultiplexer DMUXi. As shown in FIG. 4, upon receiving the multiplexed grayscale voltage from the DAC, the data line driving circuit 34 outputs multiplexed data voltages V1-V8 in one horizontal scanning period.

Then, the demultiplexer DMUXi outputs the data voltage V1 indicated by B2 to the data line S1*i* as indicated by B3, when the multiplex control signal SEL1 is active as indicated by B1 in FIG. 4. Similarly, the demultiplexer DMUXi outputs the data voltage V2 to the data line S2*i* when the multiplex control signal SEL2 is active, and outputs the data voltage V8 to the data line S8*i* when the multiplex control signal SEL8 is active.

In this manner, the demultiplexer DMUXi separates the multiplexed data voltages V1-V8 supplied to the data signal supply line Si, and outputs the same to the data lines S1*i*-S8*i*.

2. Multiplex Drive with Dispersive drive 2.1. Drive Method

Figure 5A:
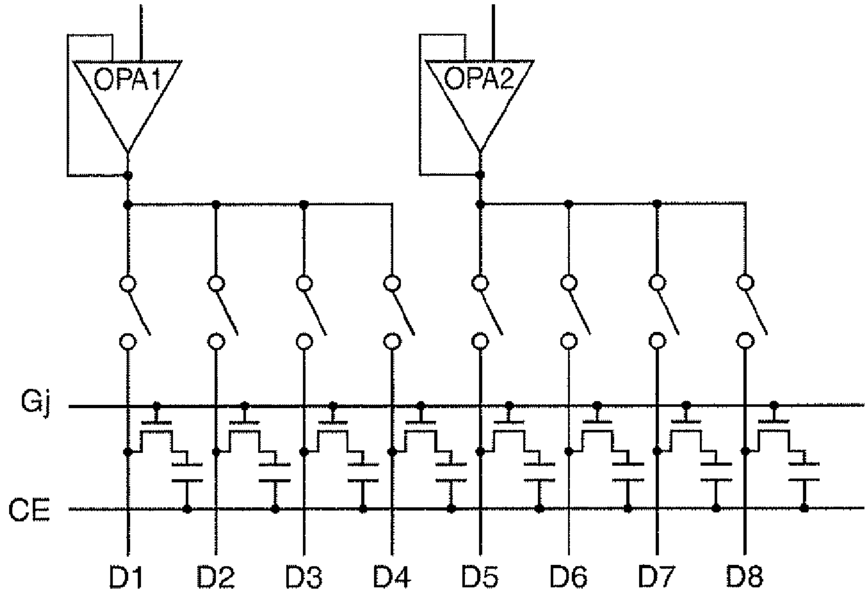
FIGS. 5A and 5B are diagrams for describing operations of a dispersive drive.
Figure 5B:
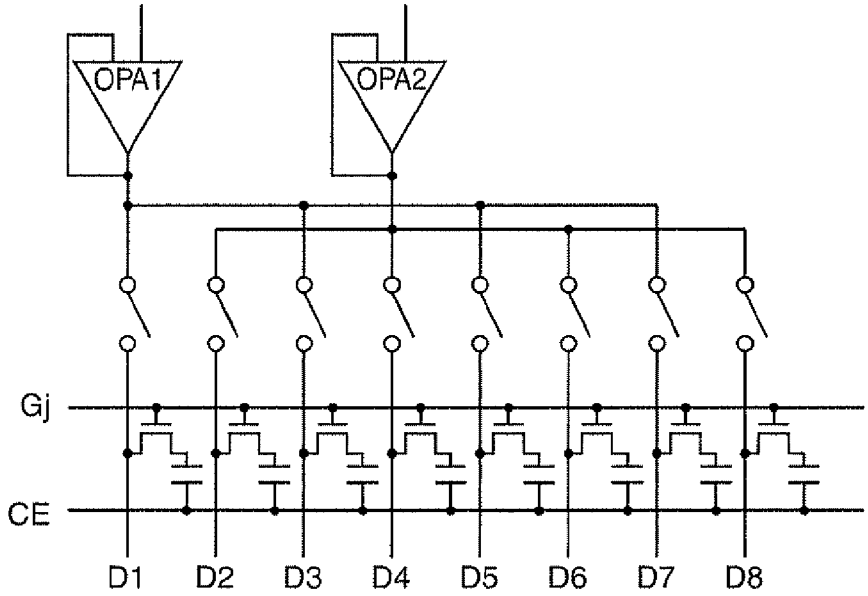

FIGS. 5A and 5B show diagrams which are used for describing a dispersive drive of the integrated circuit device in accordance with an aspect of the embodiment. FIG. 5A shows an ordinary multiplex drive, in other words, a multiplex drive without performing a dispersive drive, and FIG. 5B is a multiplex drive with a dispersive drive being performed. Both of the examples show the case where the number of multiplexes is four (4), but the number of multiplexes may be a value greater than four, for example, may be eight (8). It is noted that FIGS. 5A and 5B show only a portion of the liquid crystal panel (an electro optical panel).

In the ordinary multiplex drive, as shown in FIG. 5A, for example, an operational amplifier OPA1 sequentially drives data lines D1-D4 based on multiplex control signals SEL1-SEL4. Similarly, an operational amplifier OPA2 sequentially drives data lines D5-D8.

According to the multiplex drive with a dispersive drive being conducted, as shown in FIG. 5B, for example, an operational amplifier OPA1 sequentially drives data lines D1, D3, D5 and D7 based on multiplex control signals SEL1 SEL4. Also, an operational amplifier OPA2 sequentially drives data lines D2, D4, D6 and D8 based on SEL 1-SEL 4. In other words, the operational amplifier OPA1 multiplex-drives odd numbered data lines, and the operational amplifier OPA2 multiplex-drives even numbered data lines.

In the case of the example shown in FIG. 5B, the number of multiplexes is four (4) and the number of dispersions is two (2), but they may be other numbers. For example, when the number of multiplexes is eight (8) and the number of dispersions is two (2), the OPA1 multiplex-drives the data lines D1, D3, D5, D7, D9, D11, D13 and D15, and the OPA2 multiplex-drives the data lines D2, D4, D6, D8, D10, D12, D14 and D16. Also, for example, when the number of multiplexes is eight (8) and the number of dispersions is four (4), the OPA1 multiplex-drives the data lines D1, D5, D9, D13, D17, D21, D25 and D29, the OPA2 multiplex-drives the data lines D2, D6, D10, D14, D18, D22, D26 and D30, the OPA3 multiplex-drives the data lines D3, D7, D11, D15, D19, D23, D27 and D31, and the OPA4 multiplex-drives the data lines D4, D8, D12, D16, D20, D24, D28 and D32.

As described above, in the dispersive drive, adjacent data lines are driven by mutually independent operational amplifiers, which is a characteristic of the dispersive drive.

2.2. Effect of Dispersive Drive

As described above, the voltage-follower connected operation amplifier provided at the data signal supply line buffers grayscale voltages that are generated by the DAC and outputs the same. An operational amplifier having an ideal characteristic outputs a voltage that is equal to an input voltage. However, an actual operational amplifier has an offset voltage, and thus outputs a voltage with an error equal to the offset voltage shifted from the correct grayscale voltage. This offset voltage originates from variations in characteristics of devices such as transistors which form the operational amplifiers, and offset voltage values vary depending on individual operational amplifiers.

The offset voltage described above is, for example, about 10 mV. When the voltage corresponding to each grayscale level is made smaller along with an increase in the number of grayscale levels of an electro optical panel, variations in grayscale voltages due to offset voltages cannot be ignored. Specifically, if grayscale voltage outputs of adjacent two operational amplifiers have a difference greater than one grayscale level, it is possible that such difference be recognized as a display irregularity (streak).

FIG. 6A shows that display irregularities appear due to offset voltages of operational amplifiers in an ordinary multiplex drive. FIG. GA shows a case in which the multiplex drive is performed with multiplex control signals SEL1-SEL4, using eight operational amplifiers OPA1-OPA8 for 32 data lines D1-D32. As an example, voltages corresponding to ten grayscale levels are outputted to the entire data lines D1-D32. Also, the offset voltage of each of the operational amplifiers is expressed by a grayscale level corresponding to the offset voltage. For example, the OPA1 has an offset voltage corresponding to one grayscale level, the OPA3 has an offset voltage corresponding to zero grayscale level, and the other operational amplifiers up to OPA8 have values shown in FIG. 6A. In this case, grayscale voltages that are actually outputted equal to correct grayscale voltages with the corresponding offset voltages added thereto, respectively. Grayscale voltages that are actually outputted are represented in FIG. 6A by their corresponding grayscale levels.

As shown in FIG. 6A, twelve grayscale levels are outputted to the data lines D5-D8, ten grayscale levels to the data lines D9-D12, twelve grayscale levels to the data lines D13-D16, and ten grayscale levels to the data lines D17-D20. In other words, a brightness difference corresponding to two grayscale levels is generated at each set of four data lines, which may be recognized as display irregularities (streaks) on the display screen.

FIG. 6B shows a case of a multiplex drive with a dispersive drive being performed. Offset voltages of the operational amplifiers are the same as those of the case shown in FIG. 6A. As shown in FIG. 613, for example, the operational amplifier OPA1 multiplex-drives odd numbered data lines D1, D3, D5 and D7, and the operational amplifier OPA2 multiplex-drives even numbered data lines D2, D4, D6 and D8. Viewing actual output grayscale levels, it is observed that the twelfth grayscale level and the tenth grayscale level alternately appear on the data lines D8-D17. In this case, a brightness difference equal to two grayscale levels alternately appears at each of the data lines, such that they appear to be averaged to the naked eye and display irregularities (streaks) in the display screen do not stand out. This is the effect of reducing display irregularities provided by the dispersive drive in accordance with the present embodiment.

3. Basic Composition Example of Embodiment

As described above, when the multiplex driving is performed, there is a possibility that display irregularities (steaks) may appear on the display screen due to offset voltages of the operational amplifiers. In accordance with the present embodiment, the display irregularities described above can be reduced by using a dispersive drive to be described below.

Figure 7:
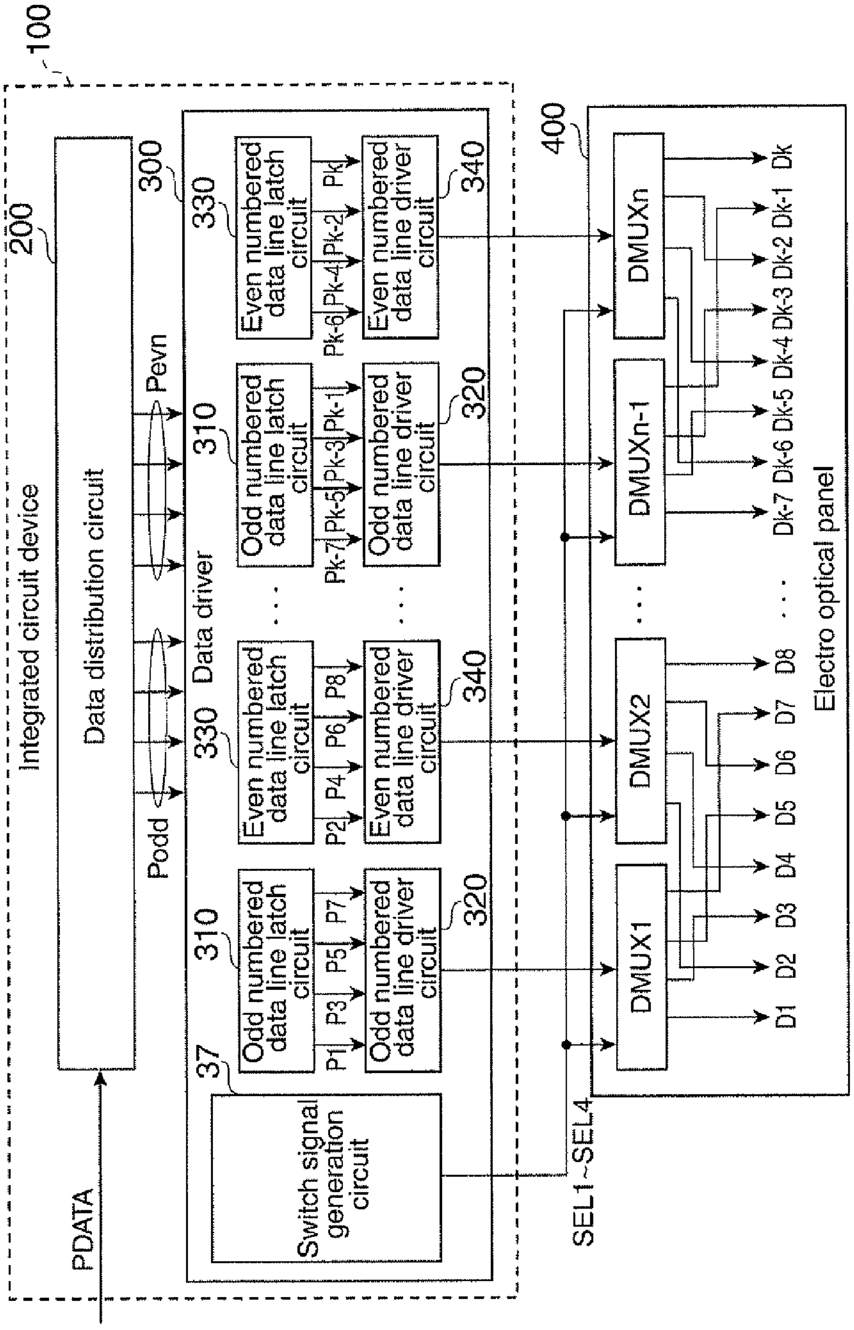
FIG. 7 shows a basic composition example of an embodiment of the invention.

FIG. 7 shows a basic example composition of the present embodiment. An integrated circuit device 100 in accordance with the present embodiment includes a data driver 300 that drives a plurality of data lines of an electro optical panel 400 (an electro optical device in a broader sense) and a data distribution circuit 200 that supplies data to the data driver 300. It is noted that the integrated circuit device 100 of the present embodiment is not limited to the composition shown in FIG. 7, and it is possible to make many modifications including omission of a portion of the components thereof, replacement of a portion with other components, addition of other components thereto, and the like.

The data driver 300 includes odd numbered data line driver circuits 320 that drive odd numbered data lines among the plural data lines, even numbered data line driver circuits 340 that drive even numbered data lines among the plural data lines, odd numbered data line latch circuits 310 provided for corresponding ones of the odd numbered data line driver circuits 320, and even numbered data line latch circuits 330 provided for corresponding ones of the even numbered data line driver circuits 340.

The data distribution circuit 200 receives time serially inputted image data PDATA, and supplies odd numbered data line image data Podd for the number of multiplexes to the odd numbered data line latch circuits 310. Also, the data distribution circuit 200 supplies even numbered data line image data Pevn for the number of multiplexes to the even numbered data line latch circuits 330. It is noted that the odd numbered data line image data Podd and the even numbered data line image data Pevn may not have to be for the number of multiplexes. For example, they may be more than the number of multiplexes.

Each of the odd numbered data line driver circuits 320 multiplexes (time-division multiplexes) odd numbered data line image data for the number of multiplexes (for example, P1, P3, P5 and P7), converts them into analog signals and supplies the same to the electro optical panel 400. The multiplexed odd numbered data line data signal (grayscale voltage signal) is demultiplexed by a demultiplexer (for example by the DMUX1). The demultiplexed data signals (grayscale voltage signals) thus obtained are supplied to corresponding ones of the odd numbered data lines (for example, D1, D3, D5 and D7) in one horizontal scanning period.

Similarly, each of the even numbered data line driver circuits 340 multiplexes (time-division multiplexes) even numbered data line image data for the number of multiplexes (for example, P2, P4, P6 and P8), converts them into analog signals and supplies the same to the electro optical panel 400. The multiplexed even numbered data line data signal (grayscale voltage signal) is demultiplexed by a demultiplexer (for example by the DMUX2). The demultiplexed data signals (grayscale voltage signals) thus obtained are supplied to corresponding ones of the even numbered data lines (for example, D2, D4, D6 and D8) in one horizontal scanning period.

The operation described above is performed for the data lines D1-D8, but the other data lines can be similarly operated. For example, odd numbered data line image data Pk-7, Pk-5, Pk-3 and Pk-1 (where k is a multiple of 8) are multiplexed, converted into analog signals, then demultiplexed, and supplied to corresponding ones of the odd numbered data lines Dk-7, Dk-5, Dk-3 and Dk-1, respectively. Also, even numbered data line image data Pk-6, Pk-4, Pk-2 and Pk are multiplexed, converted into analog signals, then demultiplexed, and supplied to corresponding ones of the even numbered data lines Dk-6, Dk-4, Dk-2 and Dk, respectively.

According to the basic example composition shown in FIG. 7, the integrated circuit device 100 includes a switch signal generation circuit 37 that generates demultiplex switch signals (multiplex control signals) SEL1-SEL4 for ON/OFF controlling a plurality of demultiplexing switch elements included in the demultiplexers DMUX1-DMUXn. It is noted that the demultiplexers DMUX1-DMUXn in FIG. 7 are included in the electro optical panel 400, but may be included in the data driver 300.

4. First Composition Example of Data Distribution Circuit

As described above, by adding the dispersive drive in the multiplex drive, display irregularities that may be caused by offset voltages of the operational amplifiers can be reduced. To achieve this dispersive drive, it is necessary to use the data distribution circuit 200 that, upon receiving time serially inputted image data PDATA, outputs odd numbered data line image data Podd for the number of multiplexes and even numbered data line image data Pevn for the number of multiplexes.

Figure 8:
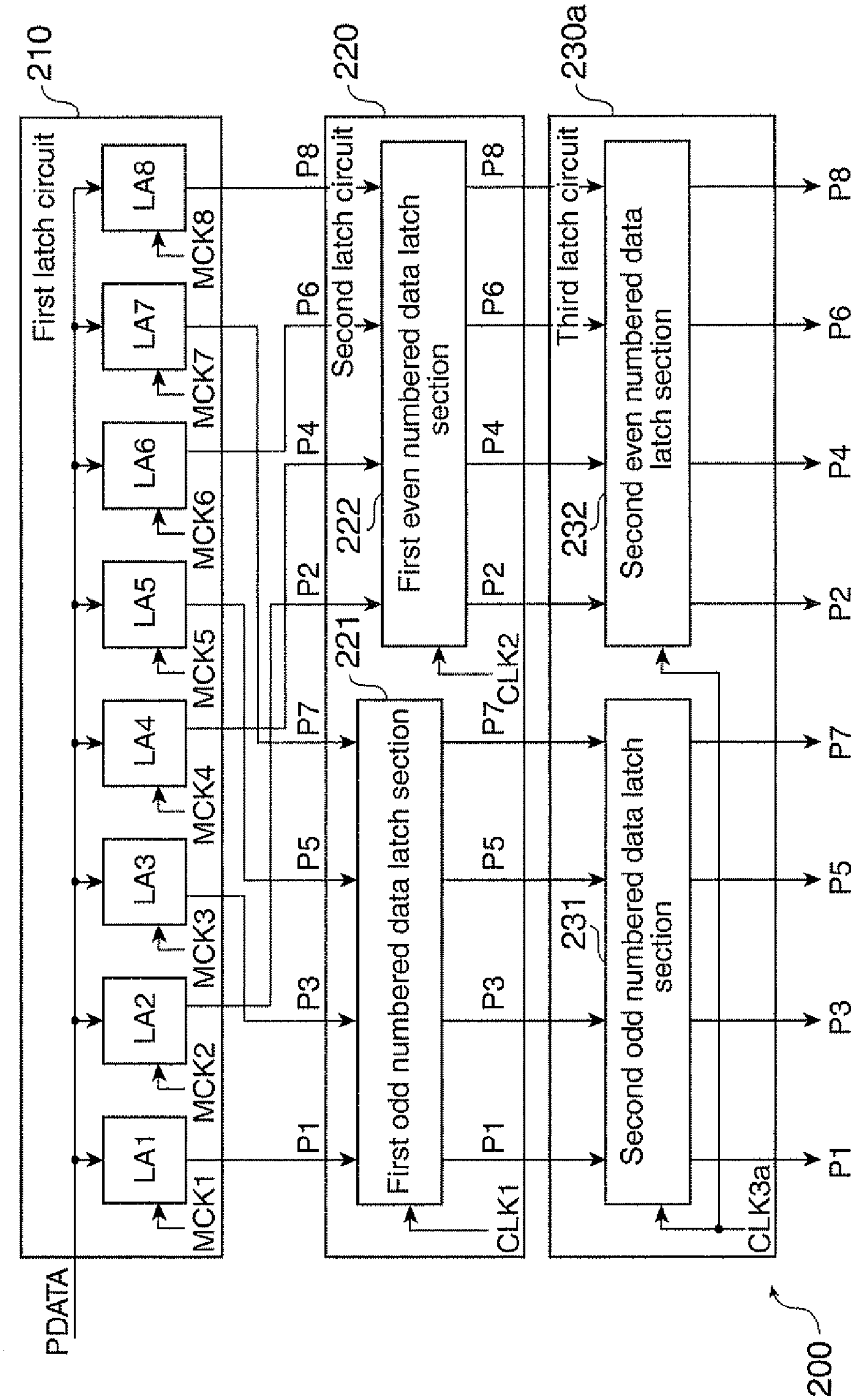
FIG. 8 shows a first composition example of a data distribution circuit.

FIG. 8 shows a first composition example of the data distribution circuit 200. The data distribution circuit 200 of the present composition example includes first, second and third latch circuits 210, 220 and 230*a*. FIG. 8 shows an example in which the number of multiplexes is set to be four and the number of dispersions is set to be two for the sake of convenience of description, but the invention is not limited to this example as stated above.

The first latch circuit 210 latches image data for at least four multiplexes with multiphase clocks. For example, as shown in FIG. 8, eight multiphase clocks MCK1-MCK8 are used to latch eight image data P1-P8 by the latch sections LA1-LA8, respectively.

The second latch circuit 220 includes a first odd numbered data latch section 221 that latches odd numbered data line image data among the image data PDATA based on a first clock CLK1, and a first even numbered data latch section 222 that latches even numbered data line image data among the image data PDATA based on a second clock CLK2. For example, as shown in FIG. 8, the first odd numbered data latch section 221 latches odd numbered data line image data P1, P3, P5 and P7 based on the first clock CLK1. Also, the first even numbered data latch section 222 latches even numbered data line image data P2, P4, P6 and P8 based on the second clock CLK2.

The first latch circuit 230*a* includes a second odd numbered data latch section 231 and a second even numbered data latch section 232. The second odd numbered data latch section 231 latches the data of the first odd numbered data latch section 221 (for example, P1, P3, P5 and P7) based on a third clock CLK3*a*, and supplies the data to the odd numbered data line latch circuit 310. Also, the second even numbered data latch section 232 latches the data of the first even numbered data latch section 222 (for example, P2, P4, P6 and P8) based on a third clock CLK3*a*, and supplies the data to the even numbered data line latch circuit 330.

As described above, according to the first composition example of the data distribution circuit shown in FIG. 8, upon receiving time serially inputted image data PDATA, it is possible to output odd numbered data line image data Podd for the number of multiplexes and even numbered data line image data Pevn for the number of multiplexes. By so doing, the dispersive drive described above becomes possible, whereby display irregularities (streaks) caused by offset voltages of the operational amplifiers can be reduced.

It is noted that FIG. 8 illustrates an example for the image data P1-P8. For image data after P8, i.e., image data P9, P10, . . . , odd numbered data line image data Pk-7, Pk-5, Pk-3 and Pk-1 (k is a multiple of 8) and even numbered data line image data Pk-6, Pk-4, Pk-2 and Pk are likewise outputted at each cycle of CLK 3*a*.

Figure 9:
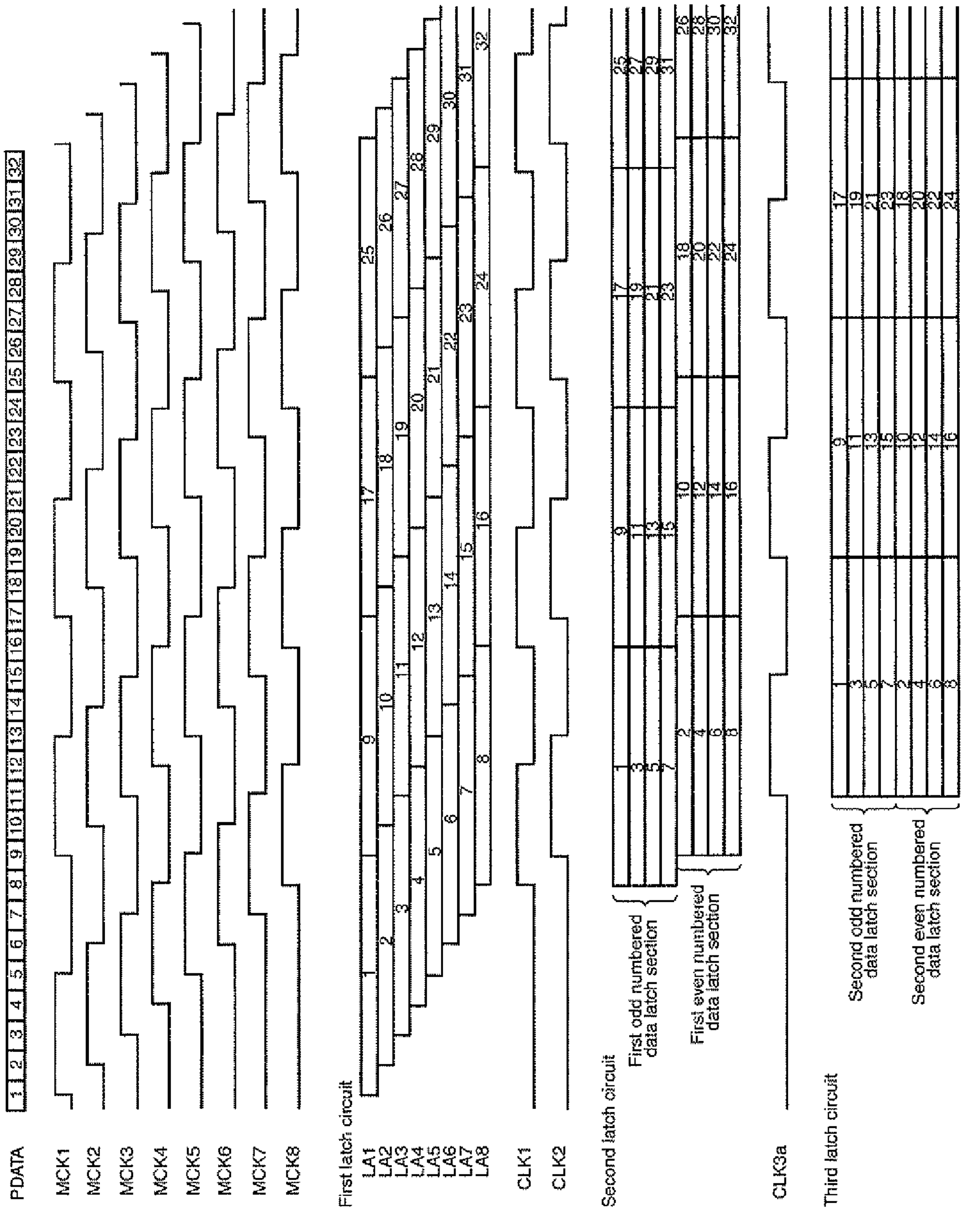
FIG. 9 shows charts for describing operations of the first composition example.

FIG. 9 shows clock signals of the first composition example of the data distribution circuit 200, and an example operation of each of the latch circuits. Referring to FIG. 9, operations of the data distribution circuit 200 will be described. It is noted that FIG. 9 shows an example in which the number of multiplexes is set to be four and the number of dispersions is set to be two, like the case shown in FIG. 8, but the invention is not limited to this example, as stated above.

Image data P1, P2, P3, . . . (which are indicated using only numbers while the letter P is omitted in FIG. 9) to be supplied to the data lines D1, D2, D3, . . . in one horizontal scanning period are time serially inputted by means of image data PDATA. Image data P1 is latched by the latch section LA1 of the first latch circuit 210 by a multiphase clock MCK1 among the multiphase clocks. Following this, image data P2-P8 are sequentially latched at the latch sections LA2-LA8 by the MCK 2-8.

Then, the image data P1, P3, P5 and P7 are latched at the first odd numbered data latch section 221 by the first clock CLK1, and then the image data P2, P4, P6 and P8 are latched at the first even numbered data latch section 222 by the second clock CLK2.

Further, by the third clock CLK3*a*, the image data P1, P3, P5 and P7 are latched at the second odd numbered data latch section 231, and the image data P2, P4, P6 and P8 are latched at the second even numbered data latch section 232. In this manner, in the period of the first cycle of the CLK3*a*, the odd numbered data line image data P1, P3, P5 and P7 and the even numbered data line image data P2, P4, P6 and P8 are outputted.

Similarly, for the image data P9-P16, in the period of the second cycle of the third clock CLK3*a*, the odd numbered data line image data P9, P11, P13 and P15 and the even numbered data line image data P10, P12, P14 and P16 are outputted. In this manner, the entire image data supplied in one horizontal scanning period is sequentially outputted at each cycle of the CLK3*a*.

Figure 10:
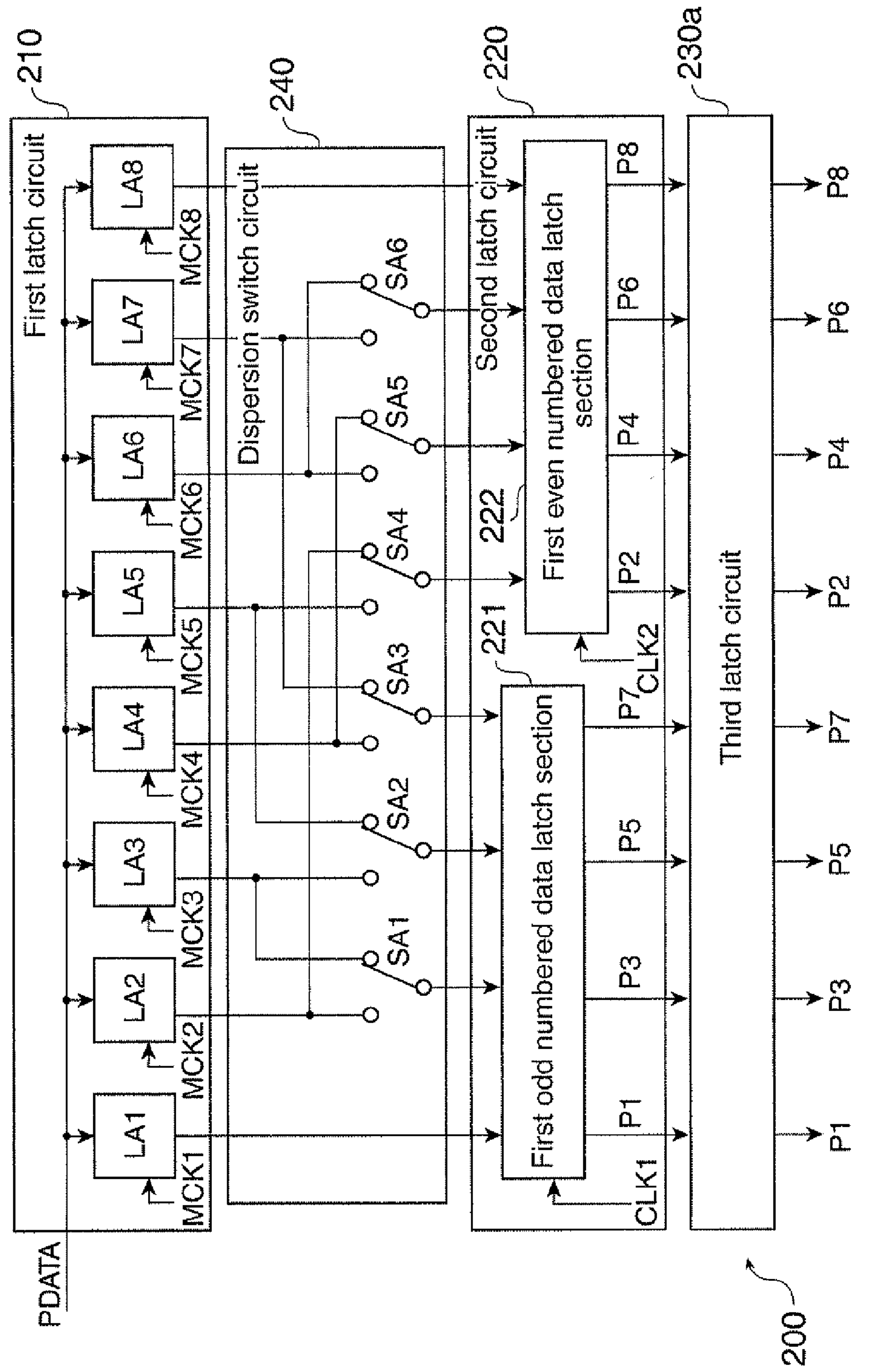
FIG. 10 shows a composition example with a dispersion switch circuit added.

FIG. 10 shows a composition example in which a dispersion switch circuit 240 is added to the first composition example described above (shown in FIG. 8). The dispersion switch circuit 240 is provided between the first latch circuit 210 and the second latch circuit 220, whereby the dispersive drive can be switched between an enabled state and a disenabled state. Specifically, when the dispersion mode is enabled, odd numbered data line image data Podd among the image data PDATA are outputted to the first odd numbered data latch section 221, and even numbered data line image data Pevn among the image data PDATA are outputted to the first even numbered data latch section 222, On the other hand, when the dispersion mode is disenabled, for example, image data P1-P4 may be outputted to the first odd numbered data latch section 221, and image data P5-P8 may be outputted to the first even numbered data latch section 222, without discriminating the odd numbered data line image data from the even numbered data line image data and vice versa. In this manner, the embodiment can also be accommodated for an ordinary multiplex drive without using the dispersive drive.

The dispersion mode can be switched by a signal from a mode setting register included in the integrated circuit device. The dispersion switch circuit 240 includes a plurality of switch circuits (SA1-SA6, for example), and the mode switching can be performed through switching connections of the switch circuits by the signal provided from the mode setting register. FIG. 10 shows a connection state when the dispersion mode is enabled.

Figure 11:
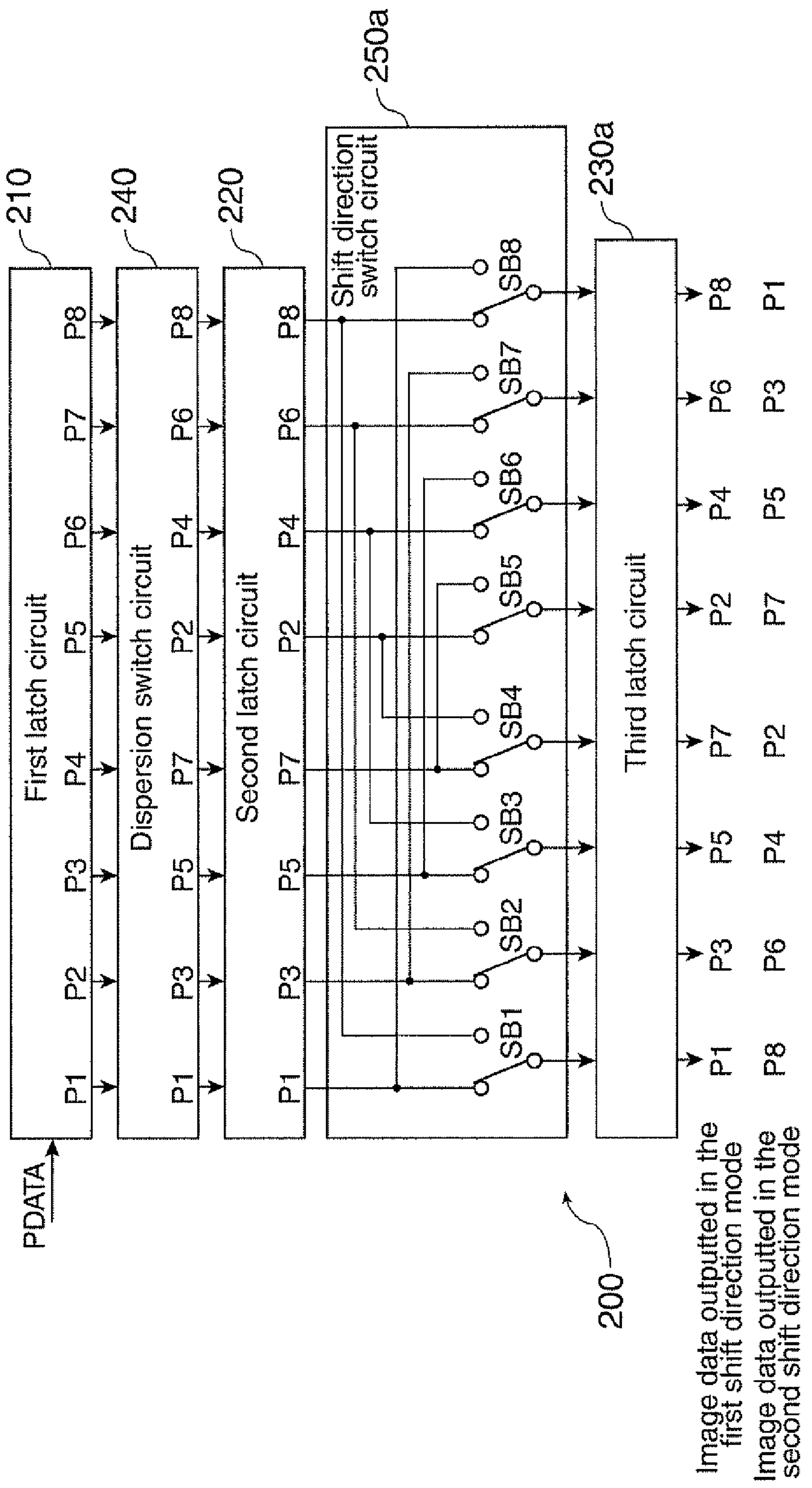
FIG. 11 shows a composition example with a shift direction switch circuit added.

FIG. 11 shows a composition example in which a shift direction switching circuit 250*a* is further added to the composition example described above (shown in FIG. 10). The shift direction switching circuit 250*a* is provided between the second latch circuit 220 and the third latch circuit 230*a*, and has first and second shift direction modes. The shift direction switching circuit 250*a* includes a plurality of switch circuits (SB1-SB8, for example), as shown in FIG. 11, and the aforementioned mode is switched through switching these switch circuits.

The shift direction mode may be switched through switching the switch circuits of the shift direction switch circuit 250*a* by a signal given from a mode setting register included in the integrated circuit device.

In the first shift direction mode, the shift direction switch circuit 250*a* outputs data of the first odd numbered data latch section 221 to the second odd numbered data latch section 231, and outputs data of the first even numbered data latch section 222 to the second even numbered data latch section 232. On the other hand, in the second shift direction mode, the shift direction switch circuit 250*a* inverts the order of data of the first odd numbered data latch section 221 and outputs the data to the second even numbered data latch section 232, and inverts the order of data of the first even numbered data latch section 222 and outputs the data to the second odd numbered data latch section 213.

More specifically, in the first shift direction mode, for example, image data P1, P3, P5 and P7 in this order are supplied to the odd numbered data line latch circuit 310, and image data P2, P4, P6 and P8 in this order are supplied to the even numbered data line latch circuit 330. On the other hand, in the second shift direction mode, for example, image data P8, P6, P4 and P2 in this order are supplied to the odd numbered data line latch circuit 310, and image data P7, P5, P3 and P1 in this order are supplied to the even numbered data line latch circuit 330.

By using the second shift direction mode, an image displayed on the electro optical panel 400 can be left-to-right inverted (mirror-inverted). This makes it possible to accommodate two types of projectors, i.e., front projection type and rear projection type projectors (projection type display devices).

5. Second Composition Example of Data Distribution Circuit

Figure 12:
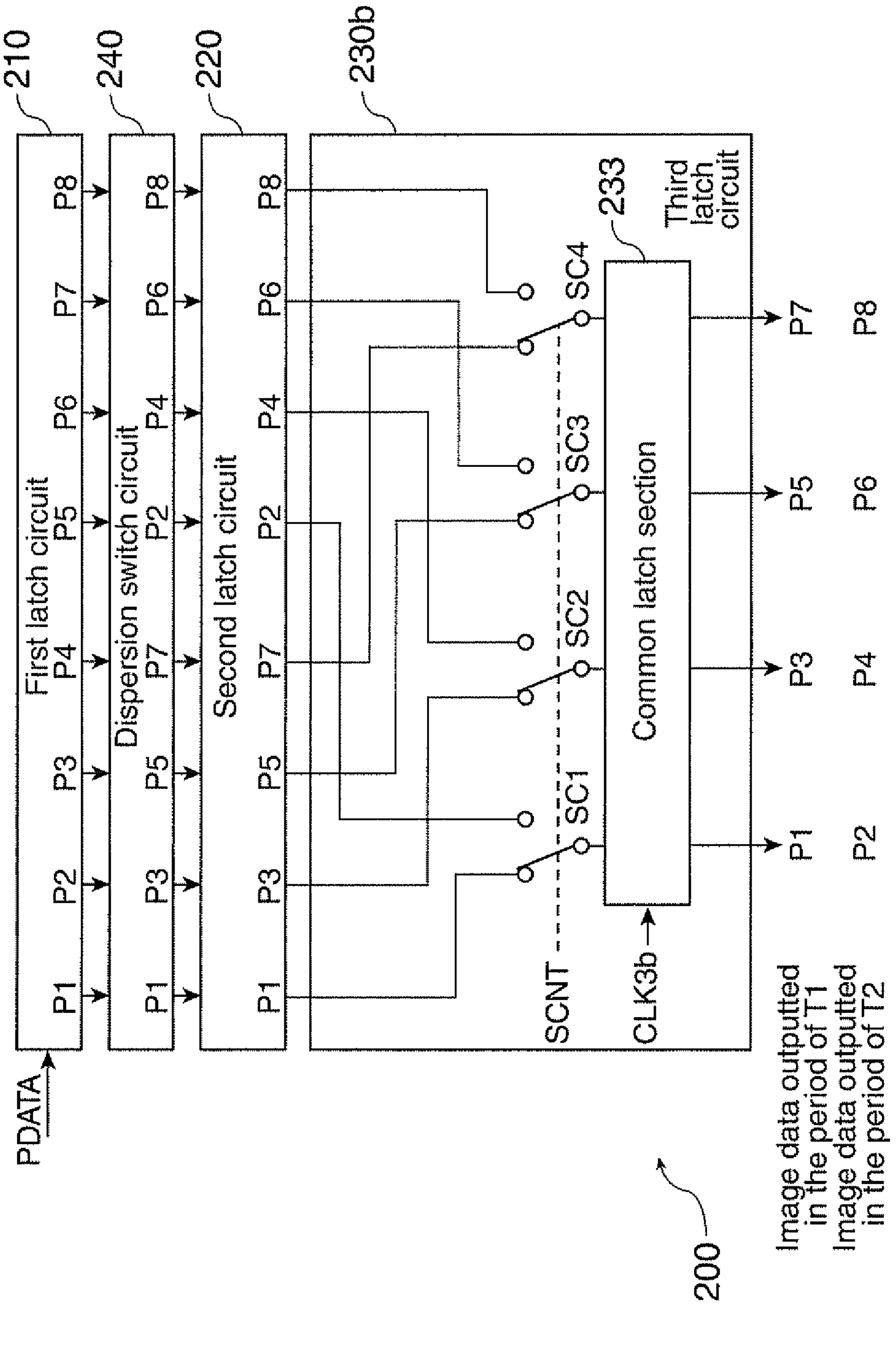
FIG. 12 shows a second composition example of a data distribution circuit.

FIG. 12 shows a second composition example of the data distribution circuit 200. In this composition example, the data distribution circuit 200 includes first, second and third latch circuits 210, 220 and 230*b*, wherein the first and second latch circuits 210 and 220 are the same as those of the first composition example shown in FIG. 8. The third latch circuit 230*b* has a common latch section 233. It is noted that the dispersion switch circuit 240 may be used for switching the dispersion mode between enabled and disenabled states, and may be omitted.

The common latch section 233 latches data of the first odd numbered data latch section 221 based on a third clock CLK3*b*, and supplies the data to the odd numbered data line latch circuit 310. Next, the common latch section 233 latches data of the first even numbered data latch section 222 based on the third clock CLK3*b*, and supplies the data to the even numbered data line latch circuit 330.

More specifically, for example, in the period of the first cycle T1 of the third clock CLK3*b*, odd numbered data line image data P1, P3, P5 and P7 are supplied, and then in the period of the second cycle T2 of the CLK3*b*, even numbered data line image data P2, P4, P6 and P8 are supplied.

Figure 13:
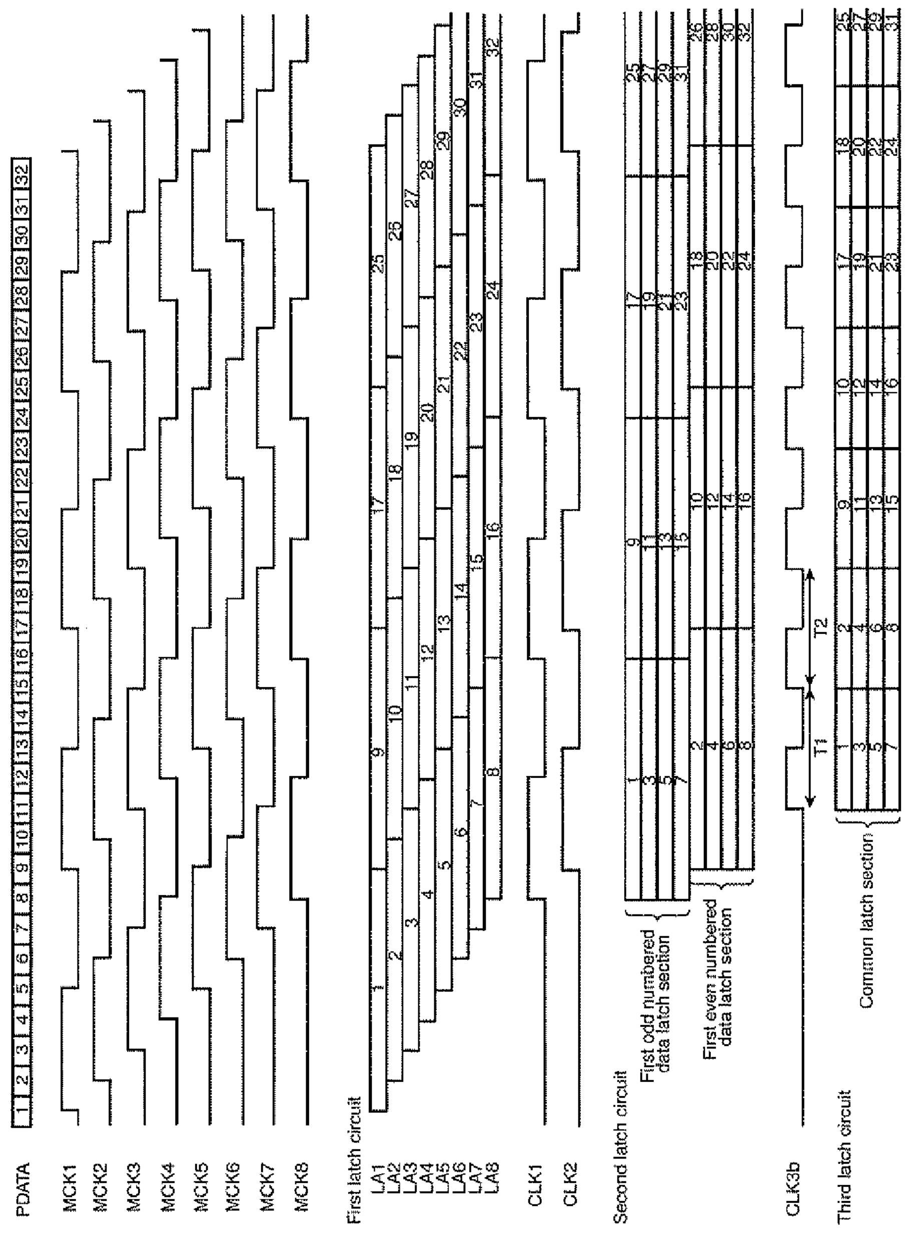
FIG. 13 shows charts for describing operations of the second composition example.

FIG. 13 shows examples of clock signals of the second composition example of the data distribution circuit 200 and example operations of the latch circuits. The operations of the first and second latch circuits 210 and 220 are the same as those of the first composition example shown in FIG. 9. As shown in FIG. 13, the common latch section 233 of the third latch circuit 230*b* outputs image data P1, P3, P5 and P7 in the period of the first cycle T1 of the third clock CLK3*b*, and then outputs image data P2, P4, P6 and P8 in the period of the second cycle T2 of the CLK3*b*. Thereafter, odd numbered data line image data and even numbered data line image data are alternately outputted at each cycle of the CLK3*b*.

As described above, according to the second composition example of the data distribution circuit 200 shown in FIG. 12, upon receiving time serially inputted image data PDATA, odd numbered data line image data Podd for the number of multiplexes and even numbered data line image data Pevn for the number of multiplexes can be alternately outputted at each cycle of the third clock CLK3*b*. By so doing, the above-described dispersion drive becomes possible, such that display irregularities (streaks) that may be caused by offset voltages of the operational amplifiers and the like can be reduced. Further, by using the common latch section 233, two latch sections, i.e., the odd numbered data latch section and the even numbered data latch section, do not need to be provided, and the common latch section can latch both of odd numbered data line image data and even numbered data line image data, such that the number of devices of the third latch circuit 230*b* can be reduced.

Figure 14:
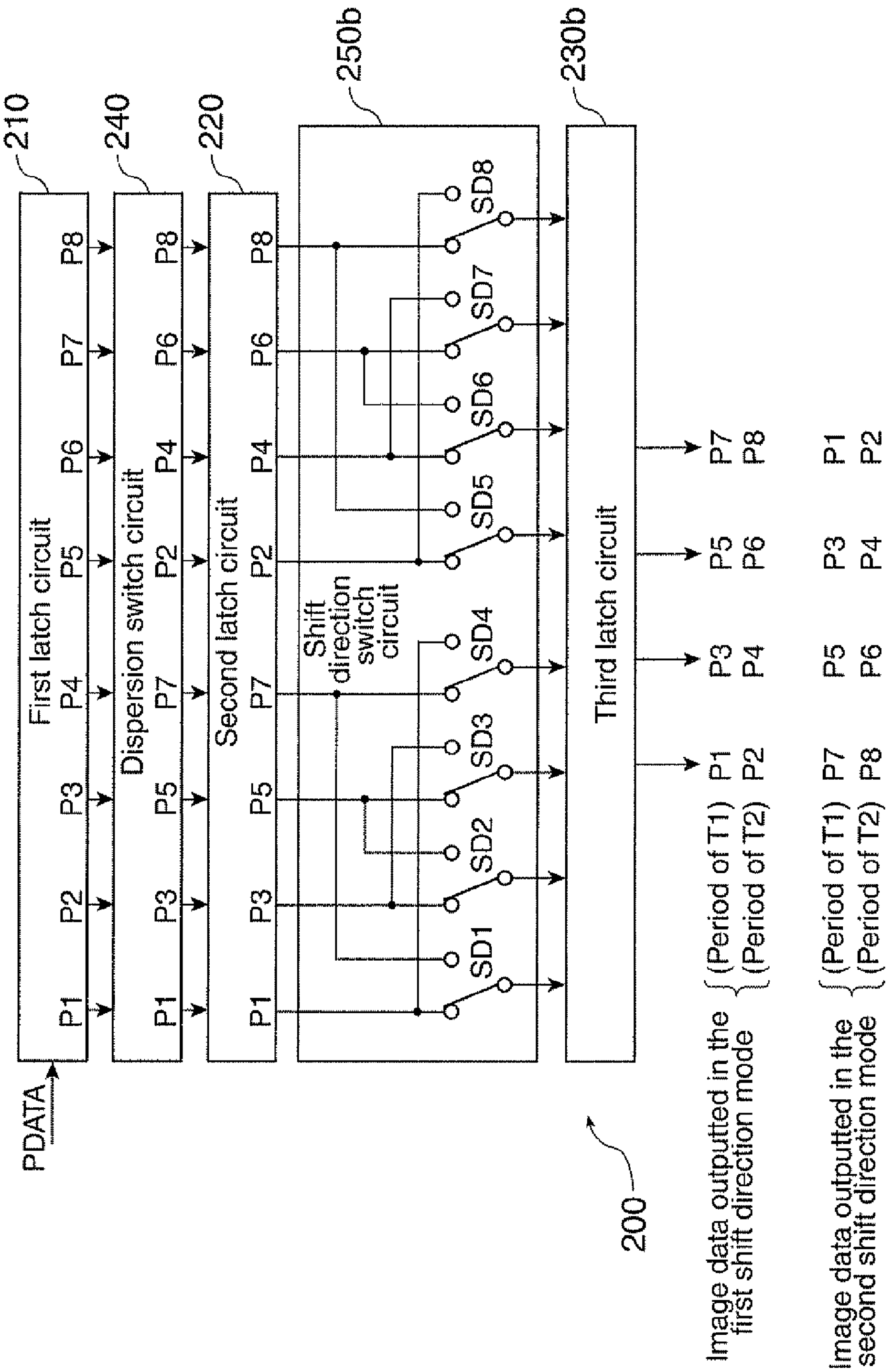
FIG. 14 shows another composition example with a shift direction switch circuit added thereto.

FIG. 14 shows an example in which a shift direction switch circuit 250*b* is added to the second example composition of the data distribution circuit 200 (shown in FIG. 12). The shift direction switch circuit 250*b* is provided between the second latch circuit 220 and the third latch circuit 230*b*, and has first and second shift direction modes. The shift direction switch circuit 250*b* includes a plurality of switch circuits (SD1-SD8, for example), as shown in FIG. 14, and the aforementioned mode is switched through switching these switch circuits.

In the first shift direction mode, the shift direction switch circuit 250*b* outputs data of the first odd numbered data latch section 221 to the common latch section 233, and then outputs data of the first even numbered data latch section 222 to the common latch section 233. On the other hand, in the second shift direction mode, the shift direction switch circuit 250*b* inverts the order of data of the first odd numbered data latch section 221 and outputs the data to the common latch section 233, and then inverts the order of data of the first even numbered data latch section 222 and outputs the data to the common latch section 233.

More specifically, in the first shift direction mode, for example, image data P1, P3, P5 and P7 in this order are supplied to the odd numbered data line latch circuit 310 in the period of the first cycle T1 of the third clock CLK3*b*, and image data P2, P4, P6 and P8 in this order are supplied to the even numbered data line latch circuit 330 in the period of the second cycle T2 of the CLK3*b*. On the other hand, in the second shift direction mode, for example, image data P8, P6, P4 and P2 in this order are supplied to the odd numbered data line latch circuit 310 in the period of the first cycle T1 of the third clock CLK3*b*, and image data P7, P5, P3 and P1 in this order are supplied to the even numbered data line latch circuit 330 in the period of the second cycle T2 of the CLK3*b*.

By using the second shift direction mode, an image displayed on the electro optical panel 400 can be left-to-right inverted (mirror-inverted). This makes it possible to accommodate two types of projectors, i.e., front projection type and rear projection type projectors (projection type display devices).

It is noted that FIGS. 12 through 14 show examples in which the number of multiplexes is set to be four and the number of dispersions is set to be two for the sake of convenience of description, but the invention is not limited to these examples, as described above.

6. Electronic Apparatus

Figure 15:
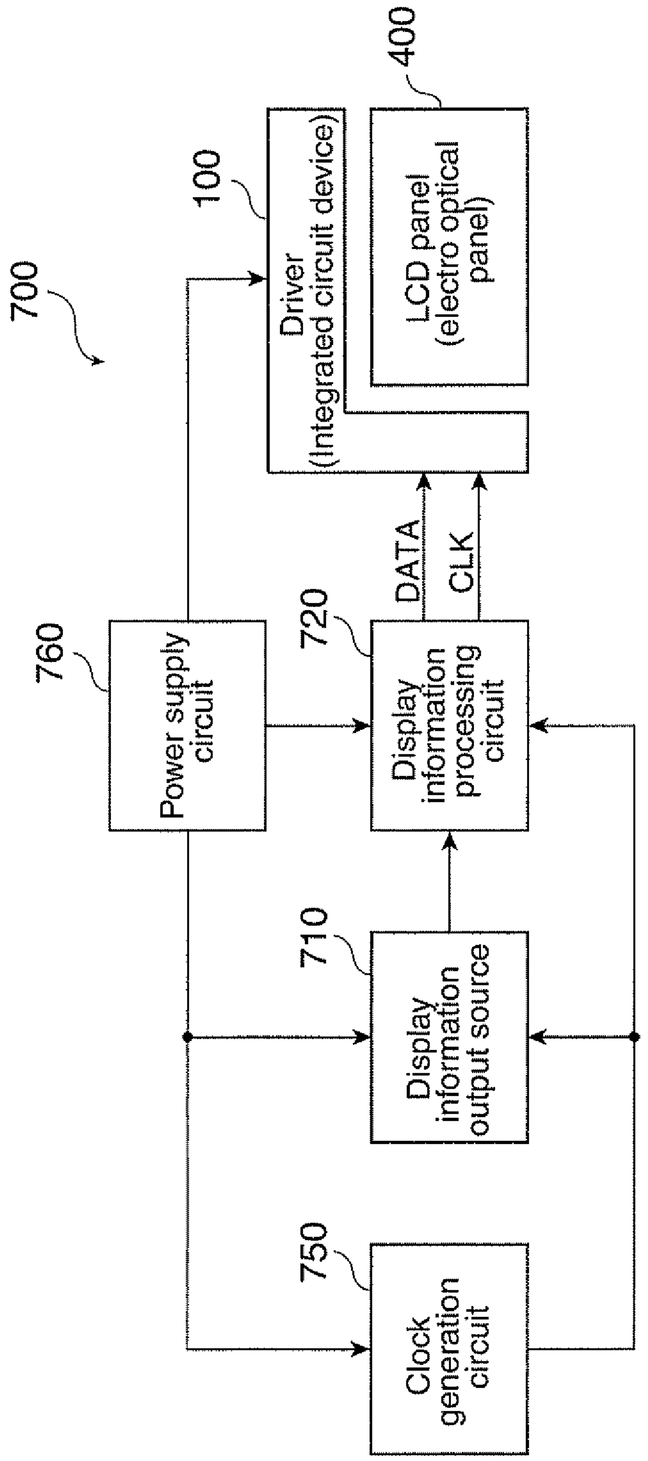
FIG. 15 shows a composition example of an electronic apparatus.

FIG. 15 shows an example composition of a projector (an electronic apparatus to which the integrated circuit device of the present embodiment is applied.

The projector 700 (a projection type display device) includes a display information output source 710, a display information processing circuit 720, a driver 100 (an integrated circuit device), a liquid crystal panel 400 (an electro-optical panel in a broader sense, and an electro optical device in an even broader sense), a clock generation circuit 750 and a power supply circuit 760.

The display information output source 710 includes a memory device, such as, a read only memory (ROM), a random access memory (RAM), an optical disc device or the like, and a tuning circuit for tuning and outputting image signals. The display information output source 710 outputs display information such as image signals in a predetermined format and the like to the display information processing circuit 720 based on a clock signal given from the clock generation circuit 750.

The display information processing circuit 720 may include an amplification-polarity inversion circuit, a phase expansion circuit, a rotation circuit, a gamma correction circuit, a clamping circuit, and the like.

The driver 100 (an integrated circuit device) includes a scanning driver (a gate driver) and a data driver (a source driver), and drives the liquid crystal panel 400 (an electro-optical panel). The power supply circuit 760 supplies power to each of the circuits described above.

It is noted that, although some embodiments of the invention have been described in detail above, those skilled in the art would readily understand that many modifications are possible without departing in substance from the novel matter and effects of the invention. Accordingly, such modifications are deemed to be included within the scope of the invention. For example, throughout the specification and the drawings, any terms described at least once with other different terms that encompass broader meaning or are synonymous can be replaced with these different terms in any sections of the specification and the drawings. Also, the structures and operations of the integrated circuit devices, the electro optical devices, the electronic apparatuses and the like are not limited to those described in the present embodiments, and many modifications can be made.

What is claimed is:

1. An integrated circuit device comprising: a data driver that drives a plurality of data lines of an electro optical device; and a data distribution circuit that supplies data to the data driver, wherein the data driver includes an odd numbered data line driver circuit for driving odd numbered data lines among the plurality of data lines, an even numbered data line driver circuit for driving even numbered data lines among the plurality of data lines, an odd numbered data line latch circuit provided for the odd numbered data line driver circuit, and an even numbered data line latch circuit provided for the even numbered data line driver circuit; and the data line distribution circuit, upon receiving time serially inputted image data, supplies odd numbered data line image data for the number of multiplexes to the odd numbered data line latch circuit, and supplies even numbered data line image data for the number of multiplexes to the even numbered data line latch circuit; wherein the odd number data line latch circuit latches the odd numbered data line image data, and supplies the odd numbered data line image data to the odd numbered data line driver circuit; the odd numbered data line driver circuit, upon receiving the odd numbered data line image data, outputs a multiplexed odd numbered data line data signal; the even numbered data line latch circuit latches the even numbered data line image data, and supplies the even numbered data line image data to the even numbered data line driver circuit; and the even numbered data line driver circuit, upon receiving the even numbered data line image data, outputs a multiplexed even numbered data line data signal, wherein demultiplexed data signals obtained by demultiplexing the multiplexed odd numbered data line data signal by a demultiplexer are supplied to corresponding ones of the odd numbered data lines in one horizontal scanning period, and demultiplexed data signals obtained by demultiplexing the multiplexed even numbered data line data signal by the demultiplexer are supplied to corresponding ones of the even numbered data lines in one horizontal scanning period.

2. An integrated circuit device according to claim 1, comprising a switch signal generation circuit that generates a demultiplex switch signal for ON/OFF controlling a plurality of demultiplex switching elements included in the demultiplexer.

3. An integrated circuit device according to claim 2, wherein the data distribution circuit includes a first latch circuit that latches the image data for at least four multiplexes with a multiphase clock, and a second latch circuit having a first odd numbered data latch section that latches the odd numbered data line image data among the image data based on a first clock, and a first even numbered data latch section that latches the even numbered data line image data among the image data based on a second clock.

4. An integrated circuit device according to claim 3, wherein the data distribution circuit includes a third latch circuit, wherein the third latch circuit includes a second odd numbered data latch section that latches data of the first odd numbered data latch section based on a third clock and supplies the data to the odd numbered data line latch circuit, and a second even numbered data latch section that latches data of the first even numbered data latch section based on the third clock, and supplies the data to the even numbered data line latch circuit.

5. An integrated circuit device according to claim 3, wherein the data distribution circuit includes a dispersion switch circuit provided between the first latch circuit and the second latch circuit, wherein, when a dispersion mode is enabled, the dispersion switch circuit outputs the odd numbered data line image data among the image data to the first odd numbered data latch section, and the even numbered data line image data among the image data to the first even numbered data latch section.

6. An integrated circuit device according to claim 4, wherein the data distribution circuit includes a shift direction switch circuit provided between the second latch circuit and the third latch circuit, wherein, in a first shift direction mode, the shift direction switch circuit outputs data of the first odd numbered data latch section to the second odd numbered data latch section and outputs data of the first even numbered data line latch section to the second even numbered data line latch section; and in a second shift direction mode, the shift direction switch circuit inverts the order of data of the first odd numbered data latch section and outputs the data to the second even numbered data line latch section, and inverts the order of data of the first even numbered data line latch section and outputs the data to the second odd numbered data latch section.

7. An integrated circuit device according to claim 3, wherein the data distribution section includes a third latch circuit including a common latch section, wherein the common latch section latches data of the first odd numbered data latch section based on a third clock and supplies the data to the odd numbered data line latch circuit, and then latches data of the first even numbered data line latch section based on the third clock and supplies the data to the even numbered data line latch section.

8. An integrated circuit device according to claim 7, wherein the data distribution circuit includes a shift direction switch circuit provided between the second latch circuit and the third latch circuit, wherein, in a first shift direction mode, the shift direction switch circuit outputs data of the first odd numbered data latch section to the common latch section, and then outputs data of the first even numbered data line latch section to the common latch section; and in a second shift direction mode, the shift direction switch circuit inverts the order of data of the first odd numbered data latch section and outputs the data to the common latch section, and then inverts the order of data of the first even numbered data line latch section and outputs the data to the common latch section.

9. An electro optical device comprising the integrated circuit device recited in claim 1.

10. An electronic apparatus comprising the integrated circuit device recited in claim 1.

* * * * *